(12) United States Patent
Harwath et al.

(10) Patent No.: US 10,515,292 B2
(45) Date of Patent: Dec. 24, 2019

(54) JOINT ACOUSTIC AND VISUAL PROCESSING

(71) Applicant: MASSACHUSETTS INSTITUTE OF TECHNOLOGY, Cambridge, MA (US)

(72) Inventors: David F. Harwath, Boston, MA (US); James R. Glass, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 196 days.

(21) Appl. No.: 15/623,682

(22) Filed: Jun. 15, 2017

(65) Prior Publication Data

US 2018/0039859 A1 Feb. 8, 2018

Related U.S. Application Data

(60) Provisional application No. 62/416,786, filed on Nov. 3, 2016, provisional application No. 62/350,461, filed on Jun. 15, 2016.

(51) Int. Cl.
*G06K 9/62* (2006.01)
*G06N 3/08* (2006.01)
(Continued)

(52) U.S. Cl.
CPC .......... *G06K 9/6215* (2013.01); *G06F 3/167* (2013.01); *G06K 9/00684* (2013.01);
(Continued)

(58) Field of Classification Search
CPC ........ G06F 3/167; G06F 16/41; G06F 16/438; G06F 16/583; G06F 17/241; G06F 21/80;
(Continued)

(56) References Cited

U.S. PATENT DOCUMENTS 5,515,490 A * 5/1996 Buchanan ........ H04N 21/23412
715/209
7,046,248 B1 * 5/2006 Perttunen .............. G06F 3/0481
345/440

(Continued)

OTHER PUBLICATIONS

Zhou, Bolei, Agata Lapedriza, Jianxiong Xiao, Antonio Torralba, and Aude Oliva. "Learning deep features for scene recognition using places database." In Advances in neural information processing systems, pp. 487-495. 2014.

(Continued)

*Primary Examiner* — Aklilu K Woldemariam
(74) *Attorney, Agent, or Firm* — Occhiuti & Rohlicek LLP

(57) ABSTRACT

An approach to joint acoustic and visual processing associates images with corresponding audio signals, for example, for the retrievals of images according to voice queries. A set of paired images and audio signals are processed without requiring transcription, segmentation, or annotation of either the images or the audio. This processing of the paired images and audio is used to determine parameters of an image processor and an audio processor, with the outputs of these processors being comparable to determine a similarity across acoustic and visual modalities. In some implementations, the image processor and the audio processor make use of deep neural networks. Further embodiments associate parts of images with corresponding parts of audio signals.

15 Claims, 7 Drawing Sheets

(3 of 7 Drawing Sheet(s) Filed in Color)

(51) Int. Cl.

| | |
|---|---|
| *G06F 3/16* | (2006.01) |
| *G10L 15/18* | (2013.01) |
| *G10L 25/54* | (2013.01) |
| *G06K 9/00* | (2006.01) |
| *G06N 3/04* | (2006.01) |
| *G10L 25/30* | (2013.01) |

(52) U.S. Cl.
CPC ......... *G06K 9/6256* (2013.01); *G06K 9/6293* (2013.01); *G06N 3/0454* (2013.01); *G06N 3/0481* (2013.01); *G06N 3/08* (2013.01); *G10L 15/1815* (2013.01); *G10L 25/54* (2013.01); *G10L 25/30* (2013.01)

(58) Field of Classification Search
CPC ...... G06F 16/40; G06F 16/48; G06F 16/9535; G06F 16/433; G06F 16/4387; G06F 16/634; G06F 16/637; G06F 16/683; G06F 16/24; G06F 3/0482; G06F 3/0481; G06F 16/44; G06F 16/483; G06F 16/739; G06F 11/3438; G06F 16/7834; G06K 9/6215; G06K 9/6256; G06K 9/00463; G06K 9/72; G10L 15/1815; G10L 25/30; G10L 25/54; G10L 19/00; G11B 27/28; H04N 21/252; H04N 21/25891; H04N 21/4756; H04N 21/6582; H04N 21/23424; H04N 21/25841; H04N 21/4312; H04N 21/812; H04N 21/84; H04N 21/26258; H04N 21/4826; H04N 21/4825; H04N 21/23412; H04N 21/233; H04N 21/234318; H04N 21/4307; H04N 21/44012; H04N 21/466; H04N 21/4668; H04N 21/8545; H04N 21/4852; H04N 21/251; H04N 21/435; H04N 21/8549; G06Q 30/0255; G06Q 30/02; G06Q 30/0273; G06Q 20/10; G06Q 30/0277; G10H 1/361; G06N 3/08; G06T 2200/24; Y10S 707/915; Y10S 707/916; H04L 67/22; H04H 2201/90; H04H 60/58; H04M 3/493
USPC ........... 382/155; 381/56; 707/733, 749, 916, 707/765, 99; 715/202, 209, 764
See application file for complete search history.

(56) References Cited

U.S. PATENT DOCUMENTS

| | | | | |
|---|---|---|---|---|
| 8,583,671 B2* | 11/2013 | Martin | ................... | G06Q 30/02 707/765 |
| 9,177,209 B2* | 11/2015 | Chang | ................ | G06K 9/00758 |
| 10,074,360 B2* | 9/2018 | Kim | ........................ | G10L 15/01 |
| 10,152,479 B1* | 12/2018 | Granstrom | ............ | G06F 16/483 |
| 2005/0071251 A1* | 3/2005 | Linden | ................... | G06Q 30/02 705/14.54 |
| 2005/0123053 A1* | 6/2005 | Cooper | ................... | G11B 27/28 375/240.24 |
| 2006/0059277 A1* | 3/2006 | Zito | ........................ | G06Q 30/02 710/15 |
| 2006/0179414 A1* | 8/2006 | Martin | ................... | G06F 16/904 715/764 |
| 2009/0222392 A1* | 9/2009 | Martin | ................. | G11B 27/105 706/46 |
| 2009/0300008 A1* | 12/2009 | Hangartner | ......... | G06F 16/4387 |
| 2010/0076983 A1* | 3/2010 | Gates | ................... | G11B 27/105 707/749 |
| 2012/0078830 A1* | 3/2012 | Bodor | ..................... | G06F 16/40 706/46 |
| 2012/0198317 A1* | 8/2012 | Eppolito | .............. | G11B 27/034 715/202 |
| 2013/0243205 A1* | 9/2013 | Wang | ...................... | G10L 25/48 381/56 |
| 2014/0280241 A1* | 9/2014 | Reblitz-Richardson | ..................... | G06F 16/24578 707/749 |
| 2014/0310819 A1* | 10/2014 | Cakarel | .............. | H04N 21/2225 726/26 |
| 2014/0351045 A1* | 11/2014 | Abihssira | ......... | H04N 21/25841 705/14.53 |
| 2016/0034454 A1* | 2/2016 | Musil | .................... | G06F 16/435 707/733 |
| 2017/0068670 A1* | 3/2017 | Orr | ......................... | G06F 16/48 |

OTHER PUBLICATIONS

Simonyan, Karen, and Andrew Zisserman. "Very deep convolutional networks for large-scale image recognition." arXiv preprint arXiv:1409.1556 (2014), 14 pages.

Harwath, David, and James Glass. "Deep multimodal semantic embeddings for speech and images." In Automatic Speech Recognition and Understanding (ASRU), 2015 IEEE Workshop on, pp. 237-244. IEEE, 2015.

Harwath, David, Antonio Torralba, and James Glass. "Unsupervised learning of spoken language with visual context." In Advances in Neural Information Processing Systems, pp. 1858-1866. 2016.

Chopra, Sumit, Raia Hadsell, and Yann LeCun. "Learning a similarity metric discriminatively, with application to face verification." In Computer Vision and Pattern Recognition, 2005. CVPR 2005. IEEE Computer Society Conference on, vol. 1, pp. 539-546. IEEE, 2005.

Gelderloos, Lieke, and Grzegorz Chrupala. "From phonemes to images: levels of representation in a recurrent neural model of visually-grounded language learning." arXiv preprint arXiv:1610.03342 (2016), 11 pages.

Karpathy, Andrej, and Li Fei-Fei. "Deep visual-semantic alignments for generating image descriptions." In Proceedings of the IEEE Conference on Computer Vision and Pattern Recognition, pp. 3128-3137. 2015.

Socher, Richard, Andrej Karpathy, Quoc V. Le, Christopher D. Manning, and Andrew Y. Ng. "Grounded compositional semantics for finding and describing images with sentences." Transactions of the Association for Computational Linguistics 2 (2014): 207-218.

\* cited by examiner a white building with red doors and a black roof that has a tree growing up the side with red flowers the front of an affluent home it is a ranch style house in front of the house there are several large spreading trees this is a picture of someone's home in the blue house with white chairs in the front on the porch it also has a nice view of the street there is a red building the red building is in front of a green lawn the lawn has been mowed recently there's a fence in front of the house

FIG. 8

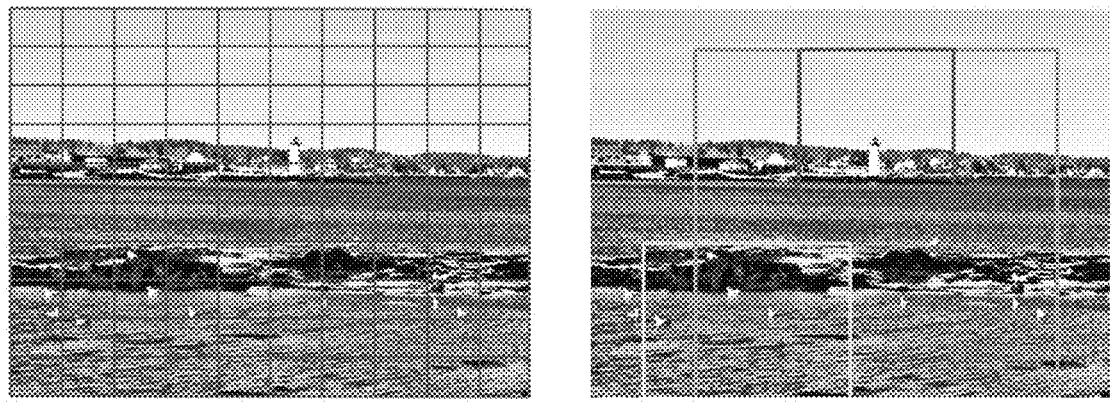

SEASIDE PICTURE THE SEVERAL FLOATING THE THE ARE AN THE IS WHITE LIGHTHOUSE
ARE SEAGULLS IN WATER SKIES CLEAR IN DISTANCE A

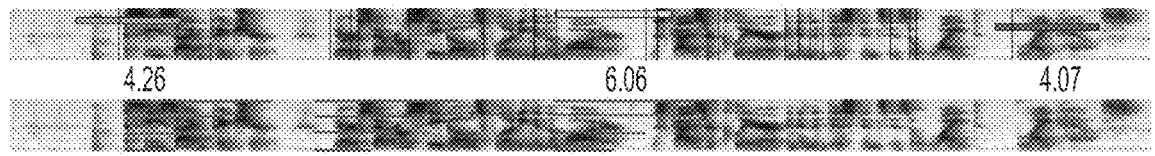

JOINT ACOUSTIC AND VISUAL PROCESSING

CROSS-REFERENCE TO RELATED APPLICATIONS

This application claims the benefit of U.S. Provisional Application No. 62/350,461, filed Jun. 15, 2016, and U.S. Provisional Application No. 62/416,786, filed Nov. 3, 2016. The contents of these applications are incorporated herein by reference.

FEDERAL SPONSORSHIP

This invention was made with government support under FA8721-05-C-0002 awarded by the U.S. Air Force. The government has certain rights in the invention.

PRIOR DISCLOSURES BY INVENTORS

The following prior disclosures are incorporated herein by reference:

Harwath, D., Glass, J. (2015, December). Deep multimodal semantic embeddings for speech and images. In *IEEE Workshop on Automatic Speech Recognition and Understanding (ASRU)* 2015 (pp. 237-244).

Harwath, D., Torralba, A., Glass, J. (2016, December). Unsupervised Learning of Spoken Language with Visual Context. In *Advances in Neural Information Processing Systems (NIPS)* 2016 (pp. 1858-1866).

Harwath, D., Glass, J. (2017). Learning Word-Like Units from Joint Audio-Visual Analysis. eprint arXiv:1701.07481.

BACKGROUND

This application relates to joint acoustic and visual processing, and more particularly relates to processing related audio and image data for purposes including cross-modality query and retrieval.

Conventional automatic speech recognition (ASR) is generally makes use of large amounts of training data and expert knowledge. These resources may take the form of audio with parallel transcriptions for training acoustic models, collections of text for training language models, and linguist-crafted lexicons mapping words to their pronunciations. The cost of accumulating these resources is immense, so it is no surprise that very few of the more than 7,000 languages spoken across the world support ASR (at the time of writing the Google Speech API supports approximately 80).

Some approaches to speech recognition attempt to make use of speech that has not be transcribed or otherwise annotated according to its content. For example, some approaches attempt to infer the set of acoustic units (e.g., analogous to phonemes). In recent years, there has been much work in the speech community towards developing completely unsupervised techniques that can learn the elements of a language solely from untranscribed audio data. For example, some approaches enabled the discovery of repetitions of the same word-like units in an untranscribed audio stream.

Completely separately, multimodal modeling of images and text has been addressed in the machine learning field during the past decade, with many approaches focusing on accurately annotating objects and regions within images. For example, some approaches rely on pre-segmented and labelled images by their content to estimate joint distributions over words and objects.

Humans learn to speak before they can read or write, so why can't computers do the same?

SUMMARY

In one aspect, in general, an approach to joint acoustic and visual processing provides a way to associate images with corresponding audio signals, for example, for the retrieval of images according to voice queries. In this approach, a set of paired images and audio signals are processed without requiring semantic annotation between the images an the audio. This processing of the paired images and audio is used to determine parameters of an image processor and an audio processor, with the outputs of these processors being comparable to determine a similarity across acoustic and visual modalities. In some implementations, the image processor and the audio processor make use of deep neural networks.

The expression "semantic annotation" should be understood to refer to meaning or concept-based annotation. Semantic annotation can include labelling and/or transcription of speech audio at a word level (including with a "one-hot" vector encoding), or at a higher level of meaning, but does not include labeling, segmentation, or transcription at the level of sub-word linguistic units, such as phones/phonemes, or segmentation even at a word or higher level that does not also include a representation of the meaning of the segments. Similarly, for images, semantic annotation includes identifying named objects in an image, but does not include annotation based on features such as edges or other object properties, or segmentation for example, based on image properties. The expression "sematic annotication between" two items means that there is semantic annotation that links the items according to a particular word or concept.

In another aspect, in general, the approach to joint acoustic and visual processing further provides a way to associate parts of images with corresponding parts of audio signals. For example, the approach determines an association between spoken instances of the words "lighthouse" within an utterance and with image regions containing lighthouses.

In another aspect, in general, a method for cross-modal media processing includes configuring a cross-modal similarity processor by processing a first reference set of media that includes a set of corresponding pairs of media items, each pair of the media items includes one audio item and one image item. The items of each pair have related content elements. For instance, one item of a pair may be an photograph of a scene, and the other item of the pair may be a recording of a speaker describing the scene in the photograph. The configuring of the similarity processor includes setting parameter values for an image processor and for an audio processor, the image processor and the audio processor being configured to produce a numerical representation of an input image and input audio signal, respectively. The simularity processor is configured to output a quantity representing a similarity between the input image and the input audio signal based on the numerical representations.

Aspects can include one or more of the following features.

The processing of the reference set of media is performed without requiring semantic annotation between the items of the corresponding pairs as an input to the processing.

The processing of the reference set of media performed requiring without semantic annotation the items of the corresponding pairs.

The image processor is configured to produce a first numerical vector (e.g. an "embedding" vector), and the audio processor is configured to produce a second numerical vector (e.g., in the same space of embeddings as the first numerical vector), and the similarity processor is configured to output a similarity between the first numerical vector and the second numerical vector, for example, as a inner product between the vectors.

A query specified as an item in a first mode is received, with the first mode being either an audio mode or image mode The configured similarity processor is used to select one or more items in a second mode different that the first mode, the second mode being either an audio mode or image mode. The selecting is done by evaluating a similarity of the query and a plurality of items to select the one or more items using the cross-modality similarity processor.

The query is specified as an audio item, and the selected one or more items comprise one or more images.

The query is specified as an image item, and the selected one or more items comprise one or more audio items. For instance, the selected item or items form an audio annotation or description of the image.

A first item is received in a first mode, the first mode being either an audio mode or image mode, and a second item is received in a second mode, the second mode being different that the first mode. The configured similarity processor is used to select a part of the second item according to the first item by evaluating a similarity of some or all of the first item and a plurality of parts of the second item using the cross-modality similarity processor.

The first item an audio item and the second item is an image item.

The first item comprises a section of an audio signal, and the image item comprises a frame of a video signal.

The audio item is presented (e.g., to a user in an audio and video user interface) concurrently with the image item. Presenting the image item includes highlighting the selected part of the image item.

The image processor and the audio processor each comprises a convolutional neural network, and processing the reference set of media includes applying a neural network weight determination approach to determine the parameter values.

A second reference set of media that includes a set of corresponding pairs of media items is processed. Each pair of the media items includes one audio item and one image item and the items of each pair having related content elements. The processing is performed without requiring segmentation or annotation of the items according to the content of the items. The processing the second reference set includes, for each pair of items of the second reference set, partitioning each item of the pair into a plurality of parts, forming a set of pairs of parts, one part of each pair from a corresponding item of the pair of items, and for each pair of parts, determining a similarity of the pair of parts using the configured similarity processor. Processing the second reference set further includes selecting a subset of the pairs of parts according to the similarity of the parts determined using the similarity processor, and for the selected subset of the pairs of parts, forming groups of similar pairs of parts, each group representing a semantic unit.

A query specified as an item in a first mode is received, the first mode being either an audio mode or image mode. The configured similarity processor and the groups representing respective semantic units are used to select one or more parts of items in a second mode different that the first mode, the second mode being either an audio mode or image mode, including evaluating a similarity of the query and a plurality of parts items to select the one or more parts of items using the cross-modality similarity processor.

Other aspects and features are evident from the following description and from the claims.

Advantage of one or more aspects include the capability of configuring a system that is able to perform semantically-related functions, including as query-based retrieval, annotation, highlighting, and recognition, without requiring human annotation of training data according to the semantic content of the data. Because human semantic annotation is not required, the system may be applied to a new domain more easily than using conventional approaches. For example, some embodiments of the system can learn cross-modal semantic associations directly from data, without the use of conventional speech recognition, text transcriptions, or any expert linguistic knowledge whatsoever. This represents a new direction in training neural networks that is a step closer to human learning, where the brain must utilize parallel sensory input to reason about its environment.

DESCRIPTION OF DRAWINGS

The patent or application file contains at least one drawing executed in color. Copies of this patent or patent application publication with color drawing(s) will be provided by the Office upon request and payment of the necessary fee.

FIG. 8 is a set of speech recognition hypotheses of the five highest scoring audio captions corresponding to the image query of FIG. 7.

FIG. 9 is an example of the grounding method.

DETAILED DESCRIPTION

Figure 1:
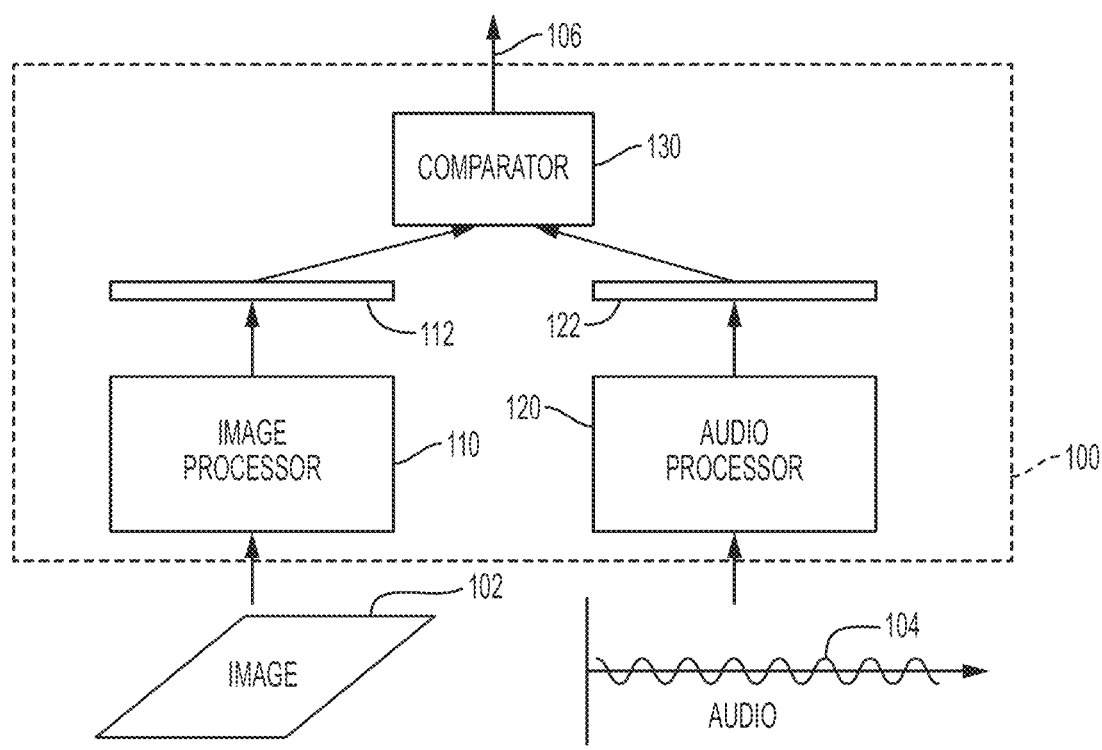
FIG. 1 is a block diagram of a joint image and audio similarity processor.

Referring to FIG. 1 a joint image and audio similarity processor 100 receives a digitized image 102, and a digitized audio signal 104 and outputs a numerical similarity score 106, which indicates a degree of association of the image and the audio signal. In general, similarity in this context is defined as the image including one or more elements that are described in the audio. For example, if the audio captures a user speaking "a lighthouse by the sea shore," and the image includes a photograph of a lighthouse, then the similarity score should indicate high similarity (e.g., the score should be close to 1.0 on a 0.0 to 1.0 scale).

The similarity processor 100 includes an image processor 110, which accepts the image 102, and produced a fixed length numerical representation 112, a d-dimensional real-valued vector, of the image. This representation is referred to below as an "embedding" of the image in a d-dimension space. As is discussed further below, the image processor 110 is parameterized, and the values of the parameters are determined in a configuration stage based on a reference set of paired images and audio signals. The similarity processor 100 also includes an audio processor 120, which accepts the audio signal 104, and produced a fixed length numerical representation 122, also a d-dimensional real-valued vector, an embedding of the image. The image processor 110 is also parameterized, and the values of these parameters are also determined in a configuration stage based on a reference set of paired images and audio signals in a joint process that determines the parameters of the image processor 110 and of the audio processor 120. The similarity processor 110 also includes a comparator 130 that compares the embedding 112 of the image and the embedding 122 of the audio sample, and produces the similarity score 106.

Figure 2:
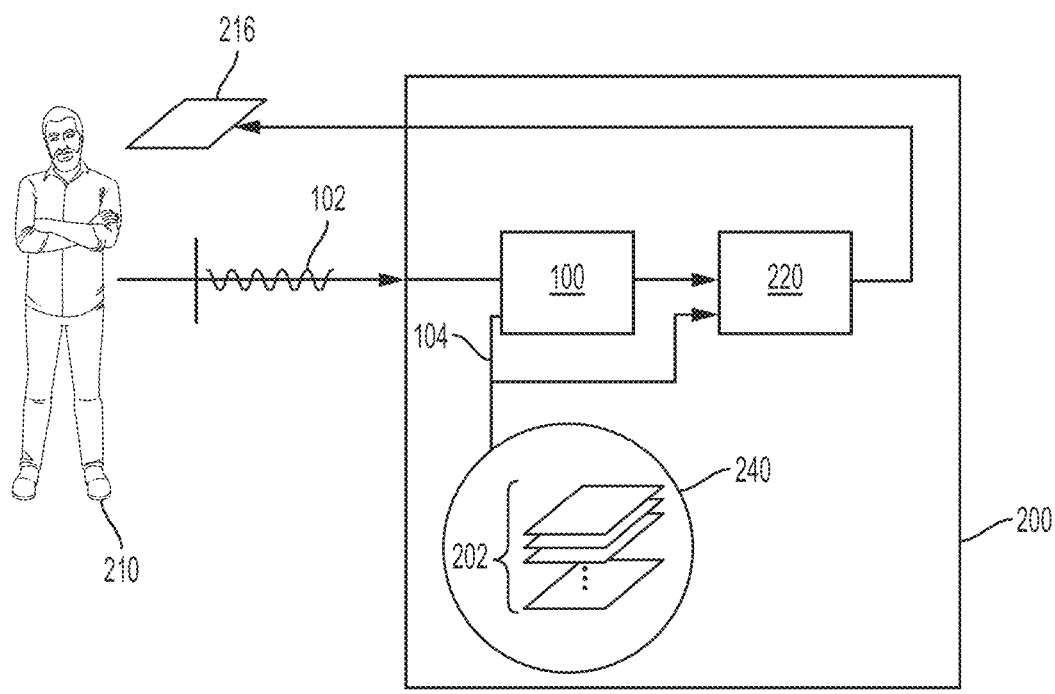
FIG. 2 is a block diagram of an audio retrieval system using the joint image and audio similarity processor of FIG. 1.

Referring to FIG. 2, as introduced above, one application of the joint image and audio similarity processor 100 of FIG. 1 is for audio-based image retrieval in which a user 210 speaks a query, which is recorded and digitized. A database 240 includes a set of individual images 202. Each image 102 from the set of images is provided along with the audio signal 102 from the user to the similarity processor 100. A search component 220 controls the presentation of the images to the similarity processor, and determines the most similar image 216 or a set of images (e.g., a set of images sorted by decreasing similarity), which is presented to the user 210 in response the audio query. It should be recognized that this application of the similarity processor 100 is only one example, and that other configurations may make use of the processor.

Figure 3:
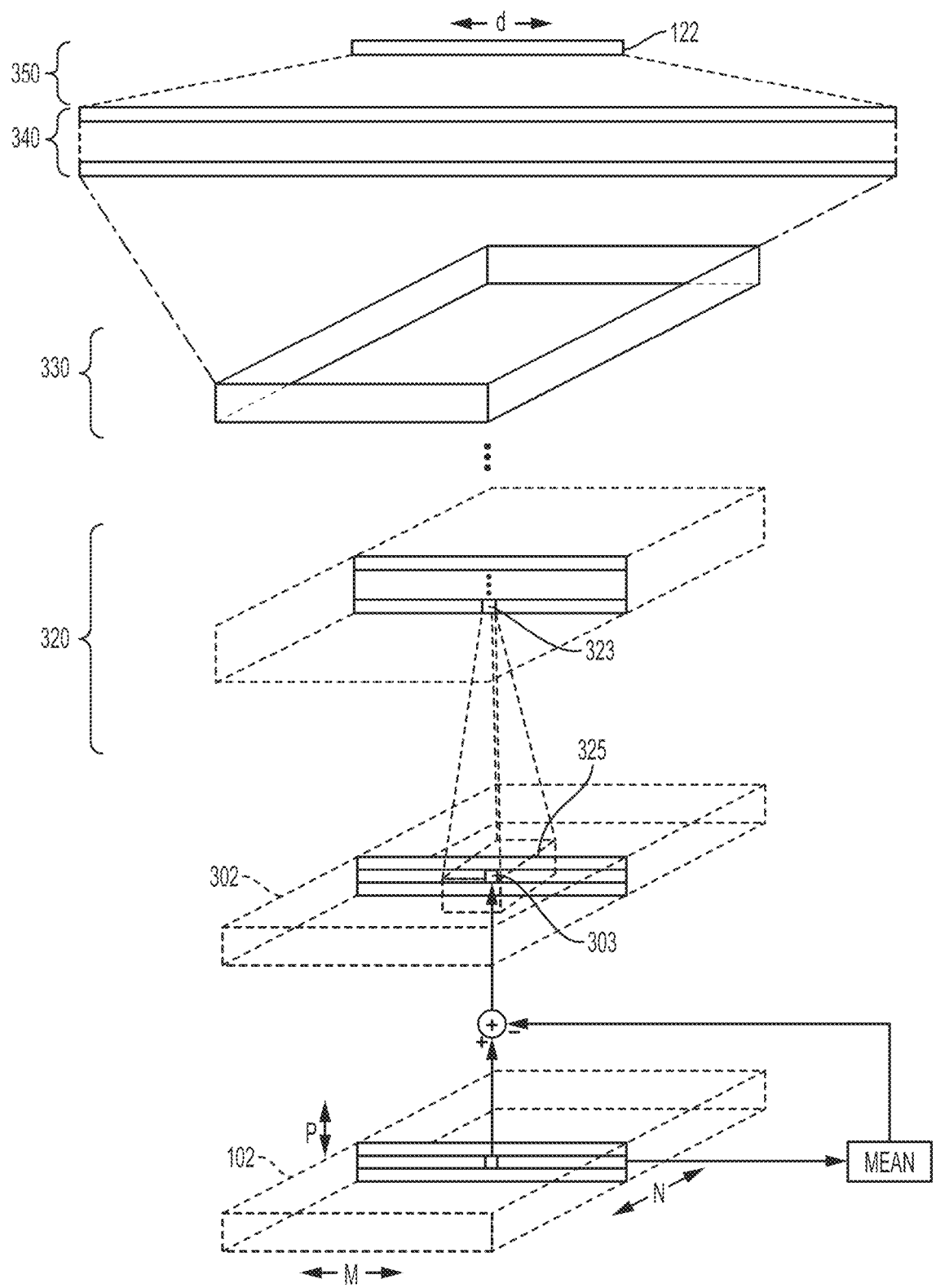
FIG. 3 is a block diagram of an image processor of the joint image and audio similarity processor of FIG. 1.

Referring to FIG. 3, the image processor 110 make use of a deep convolutional neural network structure. Aspects of this approach are the same or similar to an approach described in K. Simonyan and A. Zisserman, "Very deep convolutional networks for large-scale image recognition," *CoRR*, abs/1409.1556, 2014, which is incorporated herein by reference. In this embodiment, the input image 102 is assumed to have a fixed size, M×N (e.g., M=224 by N=224 pixels) with a fixed number, P, of planes (e.g., P=3 planes: red, green, and blue). This fixed size image is obtained either by selecting a central section by cropping a raw image and/or by scaling the image to fit the fixed pixel size. The pixel values are normalized, in this embodiment by subtracting a mean over the image for each of the color planes. The result is an M×N×P array of real values representing the normalized image 302 (i.e., P values for each pixel location (m, n)). Multiple convolutional layers 320, 330 of the neural network are applied to this normalized image. Considering a first layer 320, each output value 323 of the first layer uses a convolution of an R×R pixel region 325 at the same location 303 in the image (i.e., $R^2P$ for each of the output values 323 at that location), and passing of the output of each convolution through a non-linear function, in this embodiment a rectifier linear function (i.e., the value is computed as the output of a REctifier Linear Unit, RELU), $\sigma_{RELU}(x)=x$ if $x>0$; else 0.

The convolution may be expressed as $$X^{(1)}(m, n, p) = \sigma_{RELU}\left(b_p^{(1)} + \sum_{\substack{-\frac{R-1}{2} \leq i,j \leq \frac{R-1}{2} \\ 1 \leq q \leq P^{(0)}}} \omega_{i,j,p,q}^{(1)} X^{(0)}(m+i, n+j, q)\right)$$

where $X^{(0)}$ represents the output of the previous layer and $X^{(1)}$ represents the output of the convolution layer. In general, each layer implements a number of different convolutions, where $P^{(1)}$ represents the number of convolutions, each generating one plane of output, and $P^{(0)}$ represents the number of planes in the previous layer. Therefore there are $R^2P^{(0)}P^{(1)}$ weights $\{w_{i,j,p,q}\}$ and $P^{(1)}$ biases $\{b_p\}$ for each of these layers. Multiple layers are formed in this manner, optionally using a different size of convolution in each layer. In this embodiment, R=5 is used for each of 16 layers. Furthermore, a large number of planes may be used at the intermediate layers (e.g., $P^{(k)}>>500$). The last such layer is illustrated as layer 330 in FIG. 3.

The output of the top convolutional layer 330 is passed to a number of fully-connected layers 340, in this embodiment 2 layers, each with D=4096 RELU units. There are therefore D(M N P+1) weights and biases for the first of these layers, and D(D+1) weights and biases for the further of these layers. The top layer passes to a linear transformation, which outputs the d-dimensional representation 112 of the image. This layer therefore has d D weights for the linear transformation.

In one embodiment, the image processor (other than the linear transformation at the last layer) is pretrained on a database of unrelated images that have been annotated according to their content. However, the top layer is removed from the trained network thereby providing an image representation that is at a lower level than the annotations. Therefore, the image processor is not considered to have required semantic annotation of training data as part of training the similarity processor.

In other embodiments, the pre-trained image processor is used as a starting point for further training along with the audio processor. In yet other embodiments, the image processor is initialized with random weights.

Figure 4:
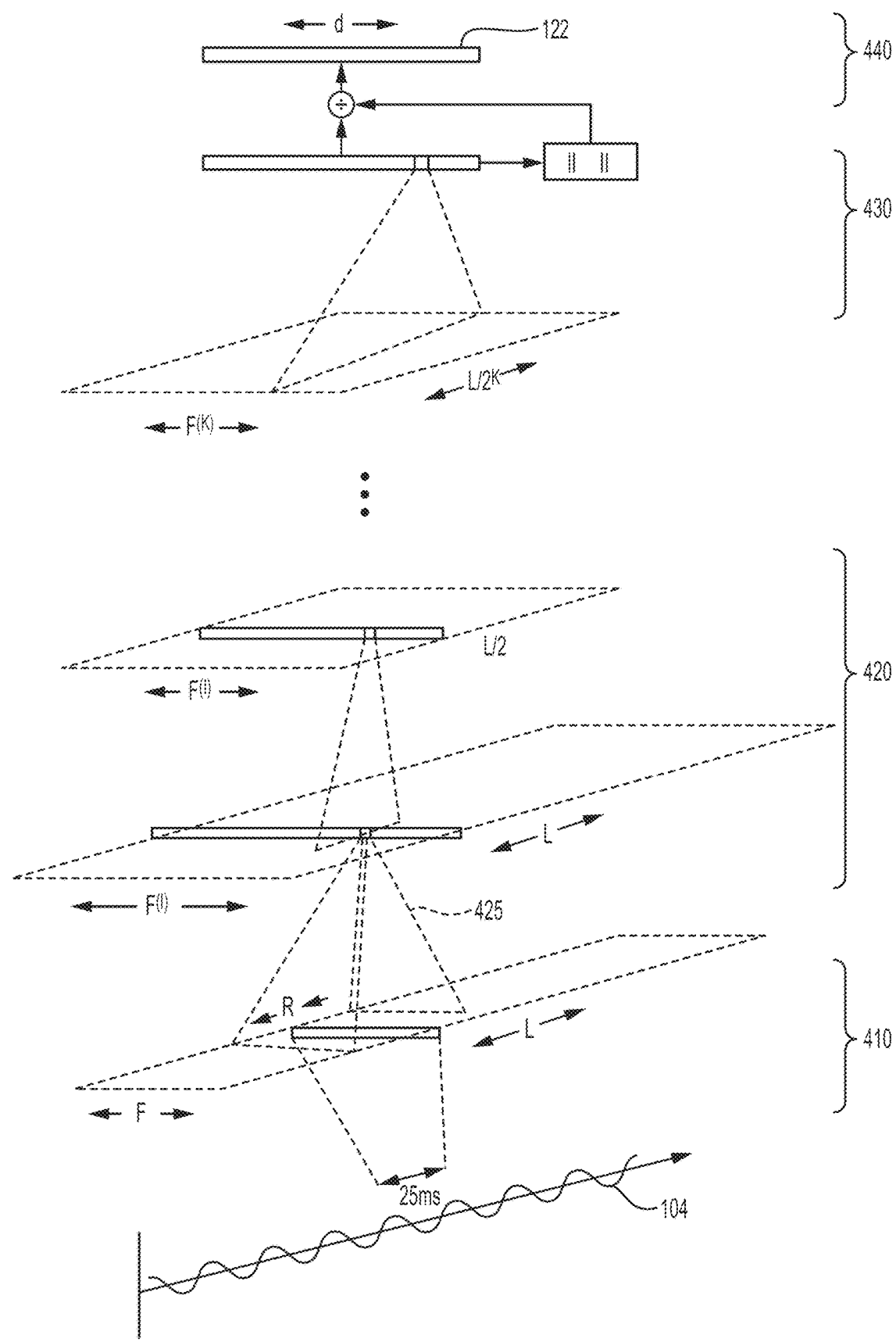
FIG. 4 is a block diagram of an audio processor of the joint image and audio similarity processor of FIG. 1.
Figure 5:
FIG. 5 is a spectrogram of an audio query and a corresponding speech recognition hypothesis text.
Figure 6:
FIG. 6 is a set of the five highest scoring images from the test set corresponding to the query of FIG. 5.
Figure 7:
FIG. 7 is a query image.

Referring to FIG. 4, the audio signal 104 is processed in a signal processing stage 410 to produce a "spectrogram" representation as a rectangular array of values for F frequency ranges and L time sections. The raw waveform 104 is processed in 25 ms. sections (e.g., windows, frames), each producing F=40 log energy within mel-spaced frequency bands spanning the speech band (e.g., 0 to 8 kHz). These sections are shifted 10 ms. in time to yield a F×L array of real numbers. For example, with a audio signal of approximately 10 seconds, L is approximately 1000. Very generally, this array is further processed in the audio processor 120 in a manner analogous to the processing of the image 102 by the image processor 110.

For reasons associated with improving the efficiency of training, each audio signal is truncated or extended (zero padded) to yield the same number L of sections. Both 10 s. and 20 s. signals were considered, although other lengths could be used. Further, it should be understood that using a fixed length L for each audio signal is not essential, and the approach can be adapted to accommodate different-length signals.

The audio processor 120 is convolutional in nature and treats the spectrogram as a 1-channel (P=1) image. However, the spectrograms have a few properties that differentiate them from images. While it is easy to imagine how visual objects in images can be translated along both the vertical and horizontal axes, the same is not quite true for words in spectrograms. A time delay manifests itself as a translation in the temporal (horizontal) direction, but a fixed pitch will always be mapped to the same frequency bin on the vertical axis. The same phone pronounced by two different speakers will not necessarily contain energy at exactly the same frequencies, but the physics is more complex than simply shifting the entire phone up and down the frequency axis. As described in more detail in the inventors' prior 2015 publication (Harwath and Glass, ASRU 2015), the filters of the first layer of the network are sized to capture the entire $F=40$-dimensional frequency axis over a context window of $R=5$ frames, or approximately 50 milliseconds. This means that in the first convolutional layer 420 the "frequency" dimension is effectively collapsed out in the first layer, and so subsequent layers are only convolutional in the temporal dimension. A number, $F^{(1)}=64$, independent convolutional filters 425 of the spectrogram are processed in this manner to yield an array of $L \times F^{(1)}$ values. A max pooling approach with a width of 4 and a stride of 2 is applied to each of the filters, yielding an array of $(L/2) \times F^{(1)}$ values. This processes is repeated in a third layer 430 to yield a $(L/4) \times F^{(2)}$ values, for $F^{(2)}=1024$.

A layer 430 performs a max (or alternatively mean) pooling over the time axis, to collapse each sequence of $L/4$ values to a single value, and then in a final layer 440 dividing by the sum of the squares of the values to yield a unit $L_2$ norm, $d=1024$-dimensional embedding 122 of the audio signal.

Referring back to FIG. 1, the comparator 130 is implemented as a inner ("dot") product between the embeddings of the image and audio signals. Alternative comparators may be used, for example $L_1$ or $L_2$ distance between the embeddings.

The overall similarity processor 100 is therefore parameterized by the parameters of the image processor 110 (i.e., the biases and weights for all the layers) and the similar parameters of the audio processor 120. As introduced above, these parameters are determined based on a set of reference pairs of images and audio signals for which elements of the image are believed to be described in speech captured in the audio signal.

In the configuration stages, the parameter values ("weights") are determined using a stochastic gradient descent procedure ("training") using an objective function which compares the similarity scores between matched image/audio pairs and mismatched pairs. The procedure uses parts of the reference data ("minibatches") in which each minibatch consists of B ground truth image-audio pairs (e.g., the minibatch size is $B=128$), each of which is paired with one impostor image and one impostor audio caption randomly sampled from the same minibatch. Let $S_j^p$ denote the similarity score between the $j^{th}$ ground truth pair, $S_j^c$ be the score between the original image and an impostor caption, and $S_j^i$ be the score between the original caption and an impostor image. The loss for the minibatch as a function of the network parameters $\theta$ is defined as:

$$\mathcal{L}(\theta) = \sum_{j=1}^{B} \max(0, S_j^c - S_j^p + 1) + \max(0, S_j^i - S_j^p + 1)$$

This loss function was encourages the procedure to assign a higher similarity score to a ground truth image/audio pair than a mismatched pair by a margin of 1. In an alternative approach, every single mismatched pair of images and captions within a minibatch may be considered rather than only sample two negative training examples for each positive training example.

The procedure described above was applied to an image search and annotation task. A new corpus of audio captions for the Places205 dataset (B. Zhou et al, "Learning deep features for scene recognition using places database," in *Proceedings of the Neural Information Processing Society*, 2014), was collected. Places205 contains over 2.5 million images categorized into 205 different scene classes, providing a rich variety of object types in many different contexts. For the experiments, a subset of the audio captions were split into a 114,000 utterance training set, a 2,400 utterance development set, and a 2,400 utterance testing set, covering a 27,891 word vocabulary. The average caption duration was 9.5 seconds, and contained an average of 21.9 words. All the sets were randomly sampled, so many of the same speakers appear in all three sets. A validation set of 1,000 image/caption pairs from the testing set described was used to produce results presented below.

To perform image search given a caption, the caption is fixed and the system computes the similarity score between the caption and each of the 1,000 images in the validation set. Image annotation works similarly, but instead the image is kept fixed and the system is tasked with finding the caption which best fits the image. An example search and annotation result are displayed in FIGS. 5-6 and 7-8, respectively.

Although the approach described above compute images and audio embeddings at the granularity of entire images and entire audio signals, an alternative approach extends to procedure in a more localized fashion. Given an image and its corresponding spoken audio caption, the term "grounding" as used herein refers to extracting meaningful segments from the caption and associating them with an appropriate sub-region of the image. For example, if an image depicts a person eating ice cream and its caption contains the spoken words "A person is enjoying some ice cream," an ideal set of groundings would entail the acoustic segment containing the word "person" linked to a bounding box around the person, and the segment containing the word "ice cream" linked to a box around the ice cream. In one approach a constrained brute force ranking scheme is used to evaluate all possible groundings (with a restricted granularity) between an image and its caption. Specifically, the image is divided on a grid, and all of the image crops whose boundaries sit on the grid lines are extracted. Minimum and maximum aspect ratios of 2:3 and 3:2 are used so as not to introduce too much distortion and also to reduce the number of proposal boxes. Further, a minimum bounding width as 30% of the original image width, and similarly a minimum height as 30% of the original image height. In practice, this results in a few thousand proposal regions per image.

To extract proposal segments from the audio caption spectrogram, a 1-dimensional grid along the time axis is similarly defined, and consider all possible start/end points at 10 frame (pixel) intervals. Minimum and maximum segment length constraints are imposed at 50 and 100 frames (pixels), implying that the discovered acoustic patterns are restricted to fall between 0.5 and 1 second in duration. The number of proposal segments varies depending on the caption length, and typically number in the several thousands. Note that when learning groundings the entire audio sequence is considered without incorporating a total 10 s. duration constraint in training as described previously.

Once a set of proposed visual bounding boxes and acoustic segments for a given image/caption pair are extracted, the previously configured ("trained") similarity processor 100 computes a score between each unique image crop/acoustic segment pair. Each triplet of an image crop, acoustic segment, and similarity score constitutes a proposed grounding. One approach is to simply keep the top N groundings from this list, but in practice there are two issues with this strategy. First, many proposed acoustic segments capture mostly silence due to pauses present in natural speech. This issue is addressed by using a simple voice activity detector (VAD). If the VAD estimates that 40% or more of any proposed acoustic segment is silence, that entire grounding is discarded. The second issue is that the top of the sorted grounding list is dominated by highly overlapping acoustic segments. This makes sense, because highly informative content words will show up in many different groundings with slightly perturbed start or end times. To alleviate this issue, when evaluating a grounding from the top of the proposal list the interval intersection over union (IOU) of its acoustic segment is compared against all acoustic segments already accepted for further consideration. If the IOU exceeds a threshold of 0.1, the new grounding is discarded. Accumulating groundings is stopped once the scores fall to below 50% of the top score in the "keep" list, or when 10 groundings have been added to the "keep" list. FIG. 9 displays a pictorial example of our grounding procedure. The left image displays a grid defining the allowed start and end coordinates for the bounding box proposals. The bottom spectrogram displays several audio region proposals drawn as the families of stacked red line segments. The image on the right and spectrogram on the top display the final output of the grounding algorithm. The top spectrogram also displays the time-aligned text transcript of the caption, so as to demonstrate which words were captured by the groundings. In this example, the top 3 groundings have been kept, with the segments corresponding to "seaside" (large image segment), "water" (lower left image segment), and "lighthouse" (top image segment).

Once the grounding procedure is completed, a small set of regions of interest in each image and caption spectrogram remain. The respective image processor 110 and audio processor 120 are used to compute embedding vectors for each grounding's image crop and acoustic segment. Then k-means clustering is employed separately on the collection of image embedding vectors as well as the collection of acoustic embedding vectors. The last step is to establish an affinity score between each image cluster I and each acoustic cluster $\mathcal{A}$; which is computed as follows $$\text{Affinity}(\mathcal{I}, \mathcal{A}) = \sum_{i \in \mathcal{I}} \sum_{a \in \mathcal{A}} i^T a \cdot \text{Pair}(i, a)$$

where i is an image crop embedding vector, a is an acoustic segment embedding vector, and Pair(i, a) is equal to 1 when i and a belong to the same grounding pair, and 0 otherwise. After clustering, a set of acoustic pattern clusters, a set of visual pattern clusters, and a set of linkages describing which acoustic clusters are associated with which image clusters remain.

To evaluate this procedure, the grounding and pattern clustering steps were performed on the entire training dataset described above, which resulted in a total of 1,161,305 unique grounding pairs. For evaluation, it is desirable to assign a label to each cluster and cluster member, but this is not completely straightforward since each acoustic segment may capture part of a word, a whole word, multiple words, etc. The strategy employed here is to force-align a speech recognition hypothesis text to the audio, and then assign a label string to each acoustic segment based upon which words it overlaps in time. A majority vote scheme was used to derive the overall cluster labels. When computing the purity of a cluster, a cluster member is counted as matching the cluster label as long as the overall cluster label appears in the member's label string.

Figure 10:
FIG. 10 is an example of a cluster associated with a "kitchen" concept.
Figure 11:
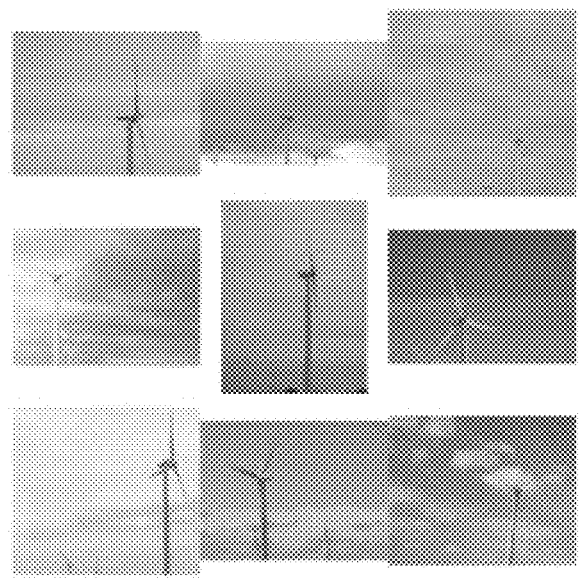
FIG. 11 is an example of a cluster associated with "windmill" concept.

In order to illustrate the results of the clustering procedure, a number of examples are shown in FIGS. 10-11. Note that determining the text of the label for the class is provided for illustration only, and is not part of the analysis process.

In the approach presented above, the audio processor makes use of direct waveform or spectrogram input. It should be understood that in addition or as an alternative to such input, a speech recognizer may be used to transform the audio to a sequence (or other representation, for example, a set or "bag") of linguist units, such as phonemes, or words, or automatically discovered acoustic units. Such automatically generated annotations, possibly viewed as semantic annotations, do not depart from the innovative approach because they do not link the items. Similarly, automatic annotation of an image, for example, according to a set of named items, which are not the items or concepts that link the image with the audio, may be semantic annotations but do not necessarily link the items.

A number of alternative variations of the above approaches may be used. For example, rather than images, video frames may be analyzed in a same or similar manner, for example, using a portion of an audio narration in the vicinity of each frame of video. Also, although example applications in which one modality (audio or image) may be used as a query to retrieve items in the other modality, the association of elements in the two modalities may be used for processing input that has a combination of both modalities, for example to robustly identify occurrences of matching items that are present in both modes. Furthermore, there is no limitation to use only two modalities. For example, images, audio, and handwriting might be analyzed together in a like manner. Finally, although the lack of necessity of having segmentation or annotation based on content permits use of reference data that does not have to be extensively manually processed, use of the techniques described above in combination with limited amounts of annotated or segmented data is also feasible.

Another application of a similarly processor as described above involves receiving to inputs, for example, an audio signal and an image, or a video having sequential image frames. The audio and the image(s) are presented to a user including an highlighting of the image according to the concept being talked about in the audio at that time. For example, a sliding 2 second window if audio is presented as the audio input to the similarity processor, and a set of possible regions of an image (e.g., dividing the image into a set of rectangular areas) as compared to the audio, and the most similar region is highlighted in a visual display to a user. As the audio progresses, different regions of the current image are highlighted as the concept being discussed changes.

Another application of the approaches described above relates to machine translation. Conventional machine-translation technology requires training data in the form of parallel text corpora. For example, to create an English-French translation system, one would require a large collection of English text sentences, each of which is paired with a translated version of the sentence in French. The method we present for learning a grounded lexicon of acoustic units and visual objects could be leveraged to enable speech-to-speech translation technology with zero need for any sort of text transcriptions, directly parallel linguistic data, or manual human translations. By collecting a dataset of spoken captions for the same set of images in multiple languages, our model could be employed to learn the acoustic correspondences for a given object category in each language. The set of visual categories could then be used as an interlingua: words in the source language could be mapped to their associated visual categories, which are then further mapped to their associated words in the target language.

Another application of the approaches described above is in the context of speech audio paired with images of handwritten text transcriptions. Traditionally, optical character recognition (OCR) is used to map images containing handwriting to standard digital representations of text such as ASCII strings. This requires training data in the form of digitally encoded text (such as ASCII) paired with images containing handwritten text. The model that we describe in this patent could be applied to directly map untranscribed speech audio to handwriting and vice versa, without the need for an intermediate digital text representation. Such a system could be used to perform concatenative speech synthesis from handwritten input, or produce handwritten transcriptions of speech audio.

Implementations of the approaches described above may use software, hardware, or a combination of software and hardware. The software may include instructions stored on a non-transient machine-readable medium for causing a processor to perform the steps of the approaches described above. Hardware may include application-specific integrated circuits (ASICs), Field Programmable Gate Arrays (FPGAs), and the like, for example, for accelerating certain functions, such as computing the outputs of the neural networks. In some implementations, the configuration state in which the values of the parameters are determined may be performed on a computer server, and the parameter values transferred to another system that implements a run-time function such as a voice or image based query and retrieval.

It is to be understood that the foregoing description is intended to illustrate and not to limit the scope of the invention, which is defined by the scope of the appended claims. Other embodiments are within the scope of the appended claims.

What is claimed is:

1. A method for cross-modal media processing comprising:
    configuring a cross-modal similarity processor, including
        processing a first reference set of media that includes a set of corresponding pairs of media items, each pair of the media items includes one audio item and one image item, the items of each pair having related content elements;
    wherein the configuring of the similarity processor includes setting parameter values for an image processor and for an audio processor, the image processor and the audio processor each being configured to produce a fixed-length numerical representation of an input image and input audio signal, respectively, wherein the image processor is configured to produce a first numerical vector, and the audio processor is configured to produce a second numerical vector,
    wherein the image processor and the audio processor each comprises an artificial neural network, and setting parameter values for the image processor and for the audio processor includes applying a neural network weight determination approach to determine the parameter values, and
    wherein the similarity processor is configured to output a quantity representing a similarity between the input image and the input audio signal based on the numerical representations, the quantity representing the similarity comprising a similarity between the first numerical vector and the second numerical vector.

2. The method of claim 1 wherein the processing of the reference set of media is performed without requiring semantic annotation between the items of the corresponding pairs as an input to the processing.

3. The method of claim 2 wherein the processing of the reference set of media performed requiring without semantic annotation of the items of the corresponding pairs.

4. The method of claim 1 further comprising:
    receiving a query specified as an item in a first mode, the first mode being either an audio mode or image mode; and
    using the configured similarity processor to select one or more items in a second mode different that the first mode, the second mode being either an audio mode or image mode, including evaluating a similarity of the query and a plurality of items to select the one or more items using the cross-modality similarity processor.

5. The method of claim 4 wherein the query is specified as an audio item, and the selected one or more items comprise one or more images.

6. The method of claim 4 wherein the query is specified as an image item, and the selected one or more items comprise one or more audio items.

7. The method of claim 1 further comprising:
    receiving a first item in a first mode, the first mode being either an audio mode or image mode;
    receiving a second item in a second mode, the second mode being different that the first mode; and
    using the configured similarity processor to select a part of the second item according to the first item, including evaluating a similarity of some or all of the first item and a plurality of parts of the second item using the cross-modality similarity processor.

8. The method of claim 7 wherein the first item an audio item and the second item is an image item.

9. The method of claim 8 wherein the first item comprises a section of an audio signal, and the image item comprises a frame of a video signal.

10. The method of claim 8 further comprising:
    presenting the audio item concurrently with the image item,
    wherein presenting the image item includes highlighting the selected part of the image item.

11. The method of claim 1 wherein the image processor and the audio processor each comprises a convolutional neural network.

12. The method of claim 1 further comprising:
    processing a second reference set of media that includes a set of corresponding pairs of media items, each pair of the media items includes one audio item and one image item, the items of each pair having related content elements, the processing being performed without requiring segmentation or annotation of the items according to the content of said items,
    wherein processing the second reference set includes, for each pair of items of the second reference set,
        partitioning each item of the pair into a plurality of parts,
        forming a set of pairs of parts, one part of each pair from a corresponding item of the pair of items, and
        for each pair of parts, determining a similarity of the pair of parts using the configured similarity processor;

wherein processing the second reference set further includes
  selecting a subset of the pairs of parts according to the similarity of the parts determined using the similarity processor, and
  for the selected subset of the pairs of parts, forming groups of similar pairs of parts, each group representing a semantic unit.

13. The method of claim 12 further comprising:
receiving a query specified as an item in a first mode, the first mode being either an audio mode or image mode; and
using the configured similarity processor and the groups representing respective semantic units to select one of more parts of items in a second mode different that the first mode, the second mode being either an audio mode or image mode, including evaluating a similarity of the query and a plurality of parts items to select the one or more parts of items using the cross-modality similarity processor.

14. A non-transitory machine-readable medium having instructions stored thereon, the instructions when executed by a data processing system cause said system to:
  configure a cross-modal similarity processor, by processing a first reference set of media that includes a set of corresponding pairs of media items, each pair of the media items includes one audio item and one image item, the items of each pair having related content elements;

wherein the configuring of the similarity processor includes setting parameter values for an image processor and for an audio processor, the image processor and the audio processor each being configured to produce a fixed-length numerical representation of an input image and input audio signal, respectively, wherein the image processor is configured to produce a first numerical vector, and the audio processor is configured to produce a second numerical vector, wherein the image processor and the audio processor each comprises an artificial neural network, and setting parameter values for the image processor and for the audio processor includes applying a neural network weight determination approach to determine the parameter values, and wherein the similarity processor is configured to output a quantity representing a similarity between the input image and the input audio signal based on the numerical representations, the quantity representing the similarity comprising a similarity between the first numerical vector and the second numerical vector.

15. The method of claim 1 wherein the audio processor is configured to produce the numerical representation of the input audio signal without forming a word-based semantic representation of the input audio signal.

* * * * *